United States Patent
Li

(10) Patent No.: US 6,227,682 B1
(45) Date of Patent: May 8, 2001

(54) COUPLING OF LIGHT FROM A SMALL LIGHT SOURCE FOR PROJECTION SYSTEMS USING PARABOLIC REFLECTORS

(75) Inventor: Kenneth K. Li, Arcadia, CA (US)

(73) Assignee: Cogent Light Technologies, Inc., Santa Clarita, CA (US)

( * ) Notice: Subject to any disclaimer, the term of this patent is extended or adjusted under 35 U.S.C. 154(b) by 0 days.

(21) Appl. No.: 09/532,950

(22) Filed: Mar. 22, 2000

(51) Int. Cl.⁷ .............................. F21V 13/08; F21V 7/06
(52) U.S. Cl. .................... 362/302; 362/293; 362/298; 362/301; 362/551; 362/583
(58) Field of Search ..................... 362/298, 299, 362/300, 301, 302, 304, 551, 559, 560, 583, 346, 293

(56) References Cited

U.S. PATENT DOCUMENTS

| | | | |
|---|---|---|---|
| Re. 29,017 | * 10/1976 | Hildenbrandt | 362/298 |
| 1,163,192 | 12/1915 | Adams | 353/99 |
| 2,891,437 | 6/1959 | Tripp | 353/99 |
| 4,458,302 | 7/1984 | Shiba et al. | 362/302 |
| 4,473,865 | * 9/1984 | Landa | 362/298 |
| 4,519,019 | * 5/1985 | Hall | 362/298 |
| 4,735,495 | 4/1988 | Henkes | 349/62 |
| 4,747,030 | 5/1988 | Offner et al. | 362/304 |
| 4,755,918 | 7/1988 | Pristash et al. | 362/301 |
| 5,130,913 | 7/1992 | David | 362/304 |
| 5,317,484 | 5/1994 | Davenport et al. | 362/551 |
| 5,541,746 | 7/1996 | Hamagashi et al. | 349/62 |
| 5,613,768 | * 3/1997 | Kim | 362/298 |
| 5,748,376 | 5/1998 | Lin et al. | 349/5 |
| 5,772,313 | 6/1998 | Taylor | 362/304 |
| 5,890,795 | 4/1999 | Taylor | 362/551 |

* cited by examiner

Primary Examiner—Alan Cariaso
(74) Attorney, Agent, or Firm—Rothwell, Figg, Ernst & Manbeck

(57) ABSTRACT

A portion of a first paraboloid collects and concentrates randomized light from a lamp into parallel beams directed to a portion of a second paraboloid which refocuses the light onto a homogenizer. The second paraboloid has a shape that is substantially similar to the first paraboloid reflector. The source and the target are located at the respective foci of the paraboloids such that the optical flux from the source is imaged to the target with minimal distortion in an approximately no magnification imaging system. The system may be configured to control wavelength and intensity by inserting an additional filter. In addition, a retro-reflector may be added to increase the overall flux density at homogenizer. The output is particular suitable for providing light to the light engine of projectors.

23 Claims, 5 Drawing Sheets

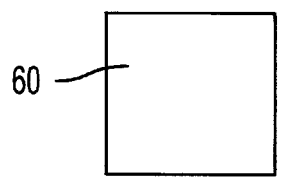
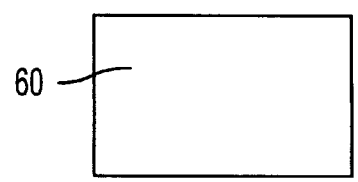
FIG. 8A     FIG. 8B
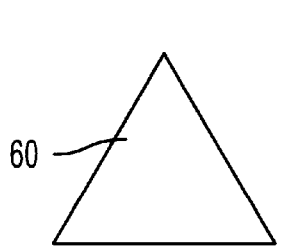 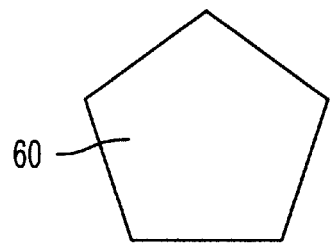 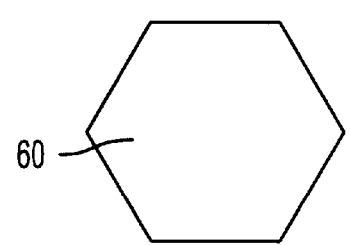
FIG. 8C     FIG. 8D     FIG. 8E
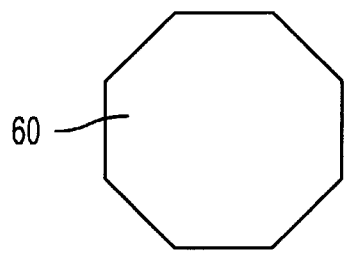
FIG. 8F
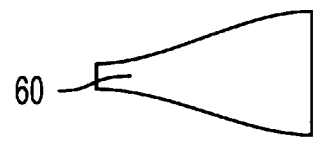
FIG. 10A
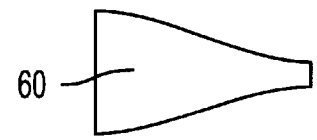
FIG. 10B
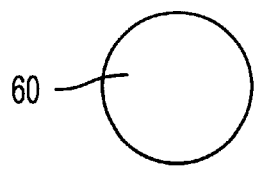
FIG. 9
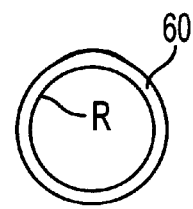
FIG. 11

COUPLING OF LIGHT FROM A SMALL LIGHT SOURCE FOR PROJECTION SYSTEMS USING PARABOLIC REFLECTORS

FIELD OF THE INVENTION

The present invention relates to a system and method for collecting and condensing electromagnetic energy to provide bright, uniform illumination to a small target in an image projection system.

BACKGROUND OF THE INVENTION

It is well known in the art of visual projectors systems to use a spatial light modulator ("SLM") positioned in a light stream. The SLM is a semi-transparent device that contains a pattern of clear and opaque regions that modify the light stream to form a projected image. In particular, the SLM consists of numerous small areas (pixels) of controllable light transparency that are electronically adjusted to produce the projected image from the light stream.

In one type of SLM, a liquid crystal modifies the light emissions from the projection system at each pixel. Transmission of light through a liquid crystal depends on the polarization state of the liquid crystal, which may be adjusted to either transmit or block light to form the equivalent of a bright or dark spot in the output. The polarization state of the liquid crystal can be electronically controlled to allow very accurate control of the light emissions. Because the liquid crystals defining the pixels are relatively small and because the electronic control allows precise control of the liquid crystals, the resulting projected image may be very accurate and sharp.

Alternatively, each pixel employs a digital mirror to modify the light emissions. The digital mirror consists of a movable mirror in which the light is either reflected toward or away from the screen, thus forming the bright or dark spots. Again, the positioning of the digital mirrors is electronically controlled to allow very accurate control of the light emissions.

Accordingly, the use of the SLM in an image projection system is advantageous because it allows precise electronic control of light emissions through the pixels. Thus, a projection system containing an SLM may produce a precise, high-resolution projected image.

However, the performance of an SLM projection system depends critically on the collection and focusing of light energy from the lamp to the SLM. In particular, to illuminate the spatial modulator and project the output onto the screen, it is necessary for the light to be uniform over the SLM and to have sufficient amount brightness.

There are several known systems for collecting and condensing light from a light source, such as a lamp, in a projection system. In an "on-axis" system, the light source and the target are located on the optical axis. In these on-axis systems, it is known to use one or more reflectors having either an ellipsoidal and parabolic shape, together with an imaging lens to direct the light from the light source. However, the on-axis systems suffer from the basic limitation of losing brightness when coupling the light source to the SLM. This loss of brightness degrades the overall efficiency and performance of the projection system.

U.S. Pat. No. 4,757,431 ("the '431 patent") describes an improved light condensing and collecting system employing an off-axis spherical concave reflector to enhance the flux illuminating a small target and the amount of collectable flux density reaching the small target. A further improved light condensing and collecting system is provided by U.S. Pat. No. 5,414,600 ("the '600 patent), which discloses the use of an ellipsoid concave reflector. Similarly, U.S. Pat. No. 5,430,634 ("the '634 patent) discloses the use of a toroid concave reflector. The systems of the '431, the '600 and the '634 patents provide a near 1 to 1 (magnification free) image and conserve brightness from the light source. However, these systems lose the 1 to 1 (unitary) magnification, which degrades overall projection system performance, as the amount of collected light is increased by raising the collection angle of the reflector. Therefore, in these systems, increasing the brightness of illumination decreases the quality of the produced image.

In the related field of spectroscopy, there is also a need to collect and condense light from a light source. In particular, light from a light source is focused into at a sample. The sample is then tested by collecting and evaluating the radiation from the sample.

In spectroscopy, it is common to use parabolic-shaped reflecting mirrors in off-axis reflecting systems to focus the light emissions from the light source. For instance, U.S. Pat. No. 3,986,767 describes a parallel beam being focused into a small spot directly onto the test sample using an off-axis paraboloid reflector. Similarly, U.S. Pat. No. 4,591,266 (Re 32,912) discloses a spectroscopy system that uses a matched pair of off-axis paraboloid reflectors that have their foci optically imaged on the sample, either at a common point or at two points which are optically imaged on each other, and having relative locations and orientations such that each ray of radiation from the light source strikes the two reflectors at points on the reflectors having approximately the same focal lengths. U.S. Pat. No. 4,473,295 illustrates the configuration of another spectroscopy system using paraboloids to collect and focus light onto a test sample.

Similarly, U.S. Pat. No. 5,191,393 ("the '393 patent") and corresponding European Patent No. EP 0 401 351 B1 relate to the transmission of light from the outside of a cleanroom into the cleanroom for optical measurement of small features. One of the configurations presented in the '393 patent is the use of an arc lamp, two paraboloids reflectors, a single fiber, and the use of transmissive dichroic filters for filtering the needed wavelengths.

The use of off-axis paraboloid, as described in the above-cited patents, intrinsically does not provide efficiently coupling from the light source to the output target.

Therefore, there remains a need for a methodology of coupling light from a small source to a projection system that overcomes these disadvantages.

SUMMARY OF THE INVENTION

In response to these needs, the present invention provides a system that uses two substantially symmetrically placed sections of a paraboloid, one at the source, and the other one at the target. The parabolic reflectors are substantially symmetrically configured so that each ray of light emitting from the source will be collimated and refocused onto the target of the projection system by the curvature at the corresponding surfaces of the two paraboloids, thus producing a substantially unit magnification and achieving maximum concentration of light.

BRIEF DESCRIPTION OF THE DRAWING

Embodiments of the present invention will be described with reference to the following figures in which like components or features in the various figures are represented by like reference numbers:

FIGS. 8a–8f are schematic views of a plurality of polygonal lightguide (waveguide) targets in cross-sections which may be employed in embodiments of the present invention.

FIG. 9 is a schematic view of a circular cross-section target which may be a single fiber, bundle of fibers, or lightguide (waveguide) utilized in the present invention.

FIG. 10a is a schematic side view illustrating an increasing taper lightguide target according to one embodiment of the invention.

FIG. 10b is a schematic side view illustrating a decreasing taper lightguide target in accordance with another embodiment.

FIG. 11 is a schematic cross-section of a hollow pipe lightguide homogenizer which may be utilized in the present invention.

DETAILED DESCRIPTIONS OF THE PREFERRED EMBODIMENTS

With reference to the figures, exemplary embodiments of the invention will now be described. These embodiments illustrate principles of the invention and should not be construed as limiting the scope of the invention.

Figure 1:
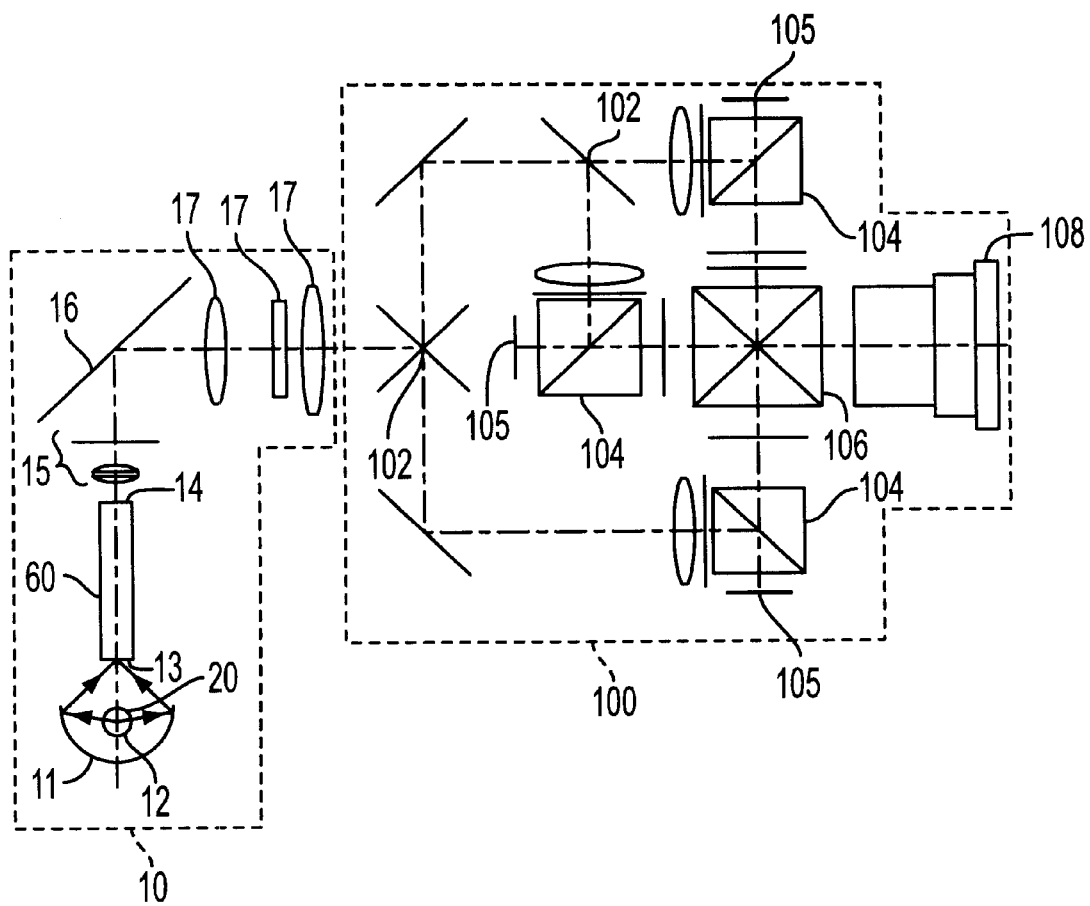
FIG. 1 (PRIOR ART) is a schematic illustration of a projection device using a known collecting and condensing optical system.

FIG. 1 illustrates a projection system that uses a known illumination assembly 10 for condensing and collecting electromagnetic radiation. The illumination assembly 10 includes a light source 20 housed into an on-axis reflector 11 having an elliptical shape, such that the light emitted from the light source 20 at a first focus 12 is collected and focused into a waveguide 60 with the input placed at a second focus 13 of the elliptical reflector 11. The waveguide 60 is typically an integrator that collects the light from the input at the second focus 13 and, through multiple reflections inside the integrator, mixes the light to produce a more uniform intensity profile at a waveguide output 14.

Generally, an ultraviolet-infrared (UV-IR) filter 15 receives the output of the waveguide output 14 and filters out much of the UV and IR radiations. The UV and IR radiations levels can be further reduced by a cold mirror 16 that reflects only radiation from the visible light portion of the electromagnetic spectrum. The illumination assembly 10 may further contain a set of relay lenses 17 that collimate the light into a substantially parallel beam for illuminating a projection light engine 100.

Inside the light engine 100, the input beam is split into three colored beams, red, green and blue, using multiple dichroic filters 102, as well known by those in the art. Each of the beams is then polarized by the polarizing beam splitter (PBS) 104 and passed through a spatial light modulator (SLM) 105 in which the intensity of each pixel of the SLM 104 is modulated by changing the polarization, as described in the above text. The three modulated output beams will then be combined by a color combiner 106 and projected onto the screen through a projection lens 108.

The amount of light that can be collected and projected through the SLM 104 depends on the surface area of the modulator and the numerical aperture N of the system defined by the etendue of the system given by:

$$\text{Etendue} = \Pi \times \text{area of illumination} \times N^2 \quad (1)$$

Regardless the total amount of light is available from the light source collected by the reflector, only the amount of light within this etendue will be usable by the light engine.

One of the functional purposes of the illumination assembly 10 is to produce an optical output that has the maximum amount of light energy within the etendue. Brightness within the etendue may be improved, for example, by using a concentrated light source or by preserving constant magnifications in the reflector.

Furthermore, the known illumination assembly system 10 the uses the single on-axis elliptical reflector 11, as illustrated in FIG. 1, or an on-axis parabolic reflector (not illustrated) has an intrinsic variation of "magnification-over-angle" that degrades the etendue of the light before it reaches the target 60, thus degrading the output from the light engine 100.

Figure 2:
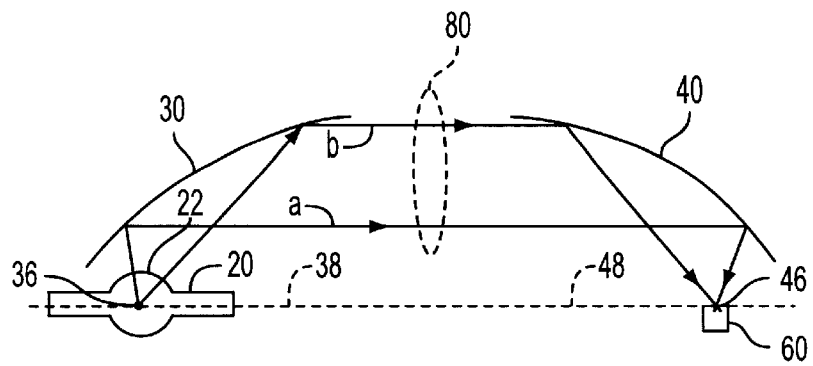
FIGS. 2–4 are schematic diagrams of various embodiments of a collecting and condensing optical system in accordance with the present invention.

The system described in this invention overcomes this fundamental limitation. Referring to FIG. 2, the present invention is a light collection and condensing system with the following four main components:

1. Electromagnetic Source

The electromagnetic source 20 is preferably a light source having an envelope 22. Most preferably, the source 20 comprises an arc lamp such as a xenon lamp, a metal-halide lamp, a HID lamp, or a mercury lamp. For certain applications, filament lamps, e.g. halogen lamps, can be used, provided the system is modified to accommodate the non-opaque filaments of the lamp, as will be described in more detail below.

2. Collimating Reflector

The collimating reflector 30 comprises a portion of a paraboloid of revolution having an optical axis 38 and a focal point 36. The collimating reflector 30 preferably has a reflective coating (e.g., aluminum or silver) and the surface is highly polished. For certain applications, the collimating reflector 30 can be made from glass coated with a wavelength-selective multilayer dielectric coating. For example, a cold coating with high reflectiveness only in the visible wavelengths can be used for visual light applications. With the source 20 placed at the focal point 36 of the collimating reflector, electromagnetic radiation that contacts the reflector 30 will be reflected as a collimated beam parallel to the optical axis 38 of the reflector 30. Where the source 20 is an arc lamp, the arc gap is preferably small compared to the focal length of the collimating reflector 30.

3. Focusing Reflector

The focusing reflector 40 comprises a portion of a paraboloid of revolution having an optical axis 48 and a focal point 46. As will be described in more detail below, the focusing reflector 40 should, however, be of substantially the same size and substantially the same shape as the collimating reflector 30.

The focusing reflector 40 is positioned and oriented so that the collimated electromagnetic radiation reflected by the collimating reflector 30 impinges the parabolic surface of the focusing reflector 40 and is thereafter focused toward the focal point 46 of the focusing reflector 40. In order to achieve substantially unit (1 to 1) magnification between the collimating reflector 30 and the focusing reflector 40 (i.e., a focused image that is substantially the same size as the source), it is important that substantially each ray of electromagnetic radiation reflected and collimated by a surface portion of the collimating reflector 30 be reflected and focused by a corresponding surface portion of the focusing reflector 40 in order to achieve a focus at the focal point 46 that is of the maximum possible brightness. In the context of the present disclosure, orienting and positioning the collimating reflector 30 and the focusing reflector 40 with respect to each other so that substantially each ray of electromagnetic radiation collimated by a surface portion of the collimating reflector 30 is focused by a corresponding surface portion of the focusing reflector 40 will be referred to as positioning the reflectors in substantial "optical symmetry" with respect to each other.

4. Target

The target 60 is a small object requiring illumination with substantially the highest intensity possible. In the preferred embodiment, the target 60 is a waveguide, such as a single core optic fiber, a fused bundle of optic fibers, a fiber bundle, or a homogenizer.

Suitable targets 60 can be polygonal in cross-section as shown in FIGS. 8a–8f or circular in cross-section as shown in FIG. 9. Further, target 60 can be an increasing taper lightguide as shown in FIG. 10a or a decreasing taper lightguide as shown in FIG. 10b. Additionally, target 60 can be a hollow pipe homogenizer as shown in FIG. 11 having reflective inner walls R.

An input end 62 of the target 60, e.g. a proximal end of the optic fiber, is positioned at the focal point of the focusing reflector 40 to receive the focused rays of electromagnetic radiation reflected by the focusing reflector 40, and the light exits the target at the output end 64.

While the target and the source are intimately associated with the collecting and condensing system of the present invention, according to its broader aspects, the invention relates to the use of two parabolic reflectors of substantially the same size and shape arranged so as to be substantially optically symmetric with respect to each other.

Continuing with the description of the collecting and condensing system, in the arrangement shown in FIG. 2, the collimating reflector 30 and the focusing reflector 40 are positioned in an opposed, facing relation with respect to each other so as to be concave toward each other. Optical symmetry is achieved in the arrangement of FIG. 2 by arranging the collimating reflector 30 and the focusing reflector 40 so that their respective optical axes 38 and 48 are optically collinear and so that the reflective surface of the collimating reflector 30 is an opposed, facing relation with the corresponding reflecting surface of the focusing reflector 40.

To facilitate the description of the present invention, two rays a and b are illustrated in FIG. 2 to show two different possible direction of the radiation emitted from the light source 20. While the distance from the light source 20 to the collimating reflector ray 30 is less along the path of the ray a, the divergence of the collimated light is relatively large. In comparison, ray b has a greater distance from the light source 20 to the collimating reflector ray 30 but has a smaller divergence beam for a finite size of the area of illumination in the light source 20. Due to the substantial symmetry of the reflectors, the rays a and b are reflected at the corresponding positions in the second parabolic reflector such that the distance for each ray between the reflector and the target has substantially the same corresponding distance between the arc and the first parabolic reflector. Thus, both the rays a and b are substantially focused onto the target 60 with substantially the same divergence and, as a result, with substantially the same magnification to preserve the brightness at the target.

It is highly desirable that the collimating reflector 30 and the focusing reflector 40 are substantially identically shaped. For instance, the collimating reflector 30 and the focusing reflector 40 may be formed using the same mold. Then, the performance of optical collecting and condensing system is further improved as the focusing reflector 40 corrects for imperfections in the collimating reflector 30.

Figure 3:
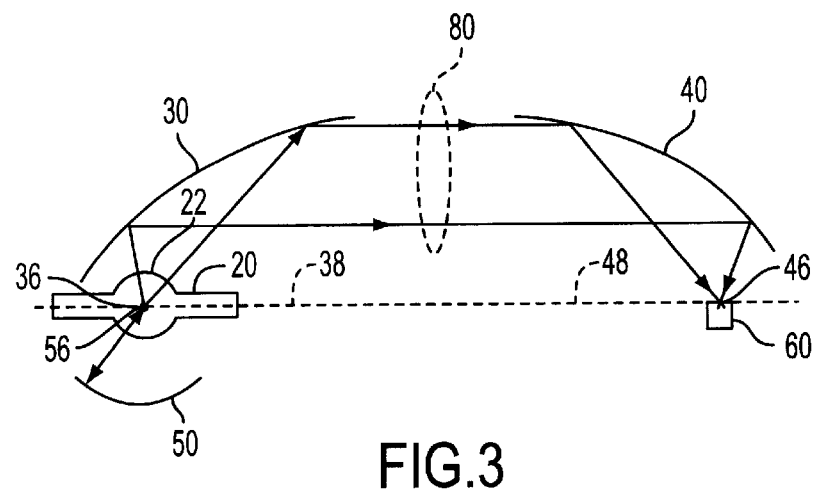
Figure 4:
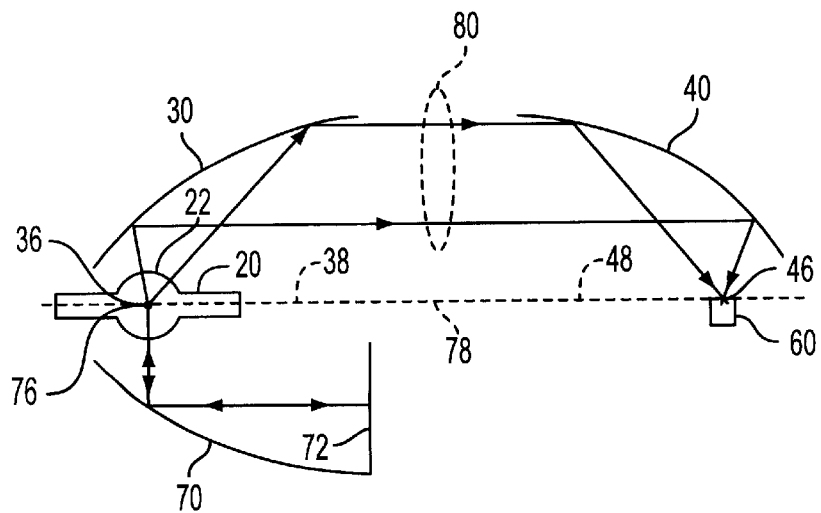

As illustrated in FIGS. 2–4, one or more optical elements 80, such as various lenses and filters known in the art, may be inserted in the spacial distance separating the collimating reflector 30 and the focusing reflector 40. Because the electromagnetic radiation transmitted between the reflectors 30 and 40 is collimated, such optical elements can be of simple shape and design.

As illustrated in FIG. 3, the collecting and condensing system of the present invention may further incorporate the use of a retro-reflector 50 that has a generally spherical shape with a center 56 located proximate to the focal point 36. The retro-reflector 50 is positioned to capture electromagnetic radiation emitted by the source 20 that would not otherwise impinge on the collimating reflector 30. More particularly, the spherical retro-reflector 50 is constructed and arranged so that radiation emitted by the source 20 in a direction away from the collimating reflector 30 is reflected back by the retro-reflector 50 through the focal point 36 of the collimating reflector 30 and thereafter toward the collimating reflector 30. This additional radiation reflected by the collimating reflector 30 is collimated and is added to the radiation that impinges the collimating reflector 30 directly from the source 20 to thereby increase the intensity of the collimated radiation reflected toward the focusing reflector 40. Consequently, the intensity of the radiation at the focal point 46 of the focusing reflector 40 is also increased.

If a filament lamp is employed as the source 20, the retro-reflector 50 cannot be oriented so that it focuses radiation back through the focal point 36 of the collimating reflector 30, because the retro-reflected radiation would be blocked by the opaque filaments located at the focal point 36. In this case, the position of the retro-reflector 50 should be adjusted so that the retro-reflected radiation does not pass precisely through the focal point 36.

An alternate arrangement of the collecting and condensing system of the present invention is shown in FIG. 4. In the arrangement of FIG. 4, the spherical retro-reflector 50 is replaced by a secondary collimating reflector 70 comprising a paraboloid of revolution having an optical axis 78 and focal point 76 that preferably substantially coincide with the optical axis 38 and the focal point 36, respectively, of the collimating reflector 30. The secondary collimating reflector 70 is preferably substantially of the same size and shape as the collimating reflector 30.

A flat reflector 72 is positioned substantially perpendicularly to the optical axis 78 at an output end of the secondary collimating reflector 70. As shown in FIG. 4, radiation emitted by the source 20 away from the collimating reflector 30 is reflected and collimated by the secondary collimating reflector 70. The collimated radiation reflected by the reflector 70, which is parallel to the optical axis 78, reflects off the flat reflector 72 back into the secondary collimating reflector 70 and is thereafter reflected back through the focal points 76 and 36 toward the collimating reflector 30, to thereby increase the intensity of the collimated radiation reflected toward the focusing reflector 40. Thus, the secondary collimating reflector 70 and the flat reflector 72 function together as a retro-reflector.

Figure 7:
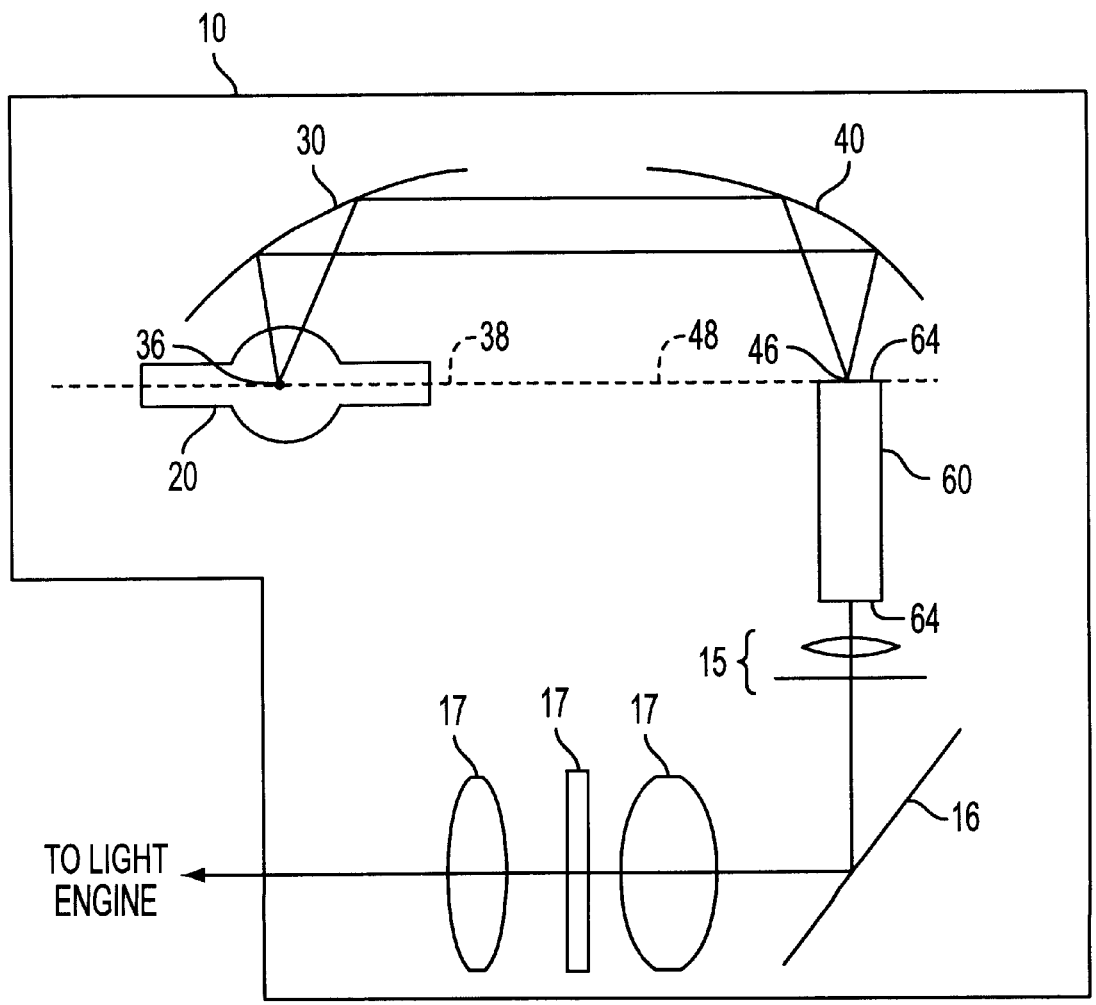
FIG. 7 is a schematic illustration of a collecting and condensing optical system for use in the projection system FIG. 1 in accordance within an embodiment of the present invention.

FIG. 7 is a schematic illustration of an illumination assembly 10 suitable for coupling to light engines 100, as illustrated in FIG. 1. It comprises light collecting and condensing system of FIG. 2, combined various optical elements to complete the illumination assembly 10. In particular, light source 20 is positioned at substantially the focus of the first parabolic reflector, collimating reflector 30. The light emitted by the light source 20 is collected, collimated, and directed to the second parabolic reflector, the focusing reflector 40. The target 60 is positioned with the input end 62 at substantially the focus 48 of the focusing reflector such that majority of the light is collected by the target. The output intensity is further increased by using a retro-reflector, such as the circular retro reflector 50, positioned at the light source 20 on the opposite side of the collimating reflector 30 such that the light collected by the retro-reflector is imaged back into the light source 20, thus increasing the brightness of the light source 20.

The "angle of illumination" is determined by the angular distribution of the light source and the two parabolic reflectors, 30 and 40. The angle in the direction of the lamp axis is generally about 180 degrees and the angle in the other direction is generally about 90 degrees. At the same time, the length of the image is generally longer along the lamp axis direction than the other direction.

The ideal output of the waveguide 60 is rectangular with a ratio of the sides equal to that of the screen having a height to width ratio of about 4-to-3 or about 16-to-9, depending on the format of the display. The angular distribution should extend substantially equally in both directions such that a circular projection lens 108 can be used efficiently.

Figure 5:
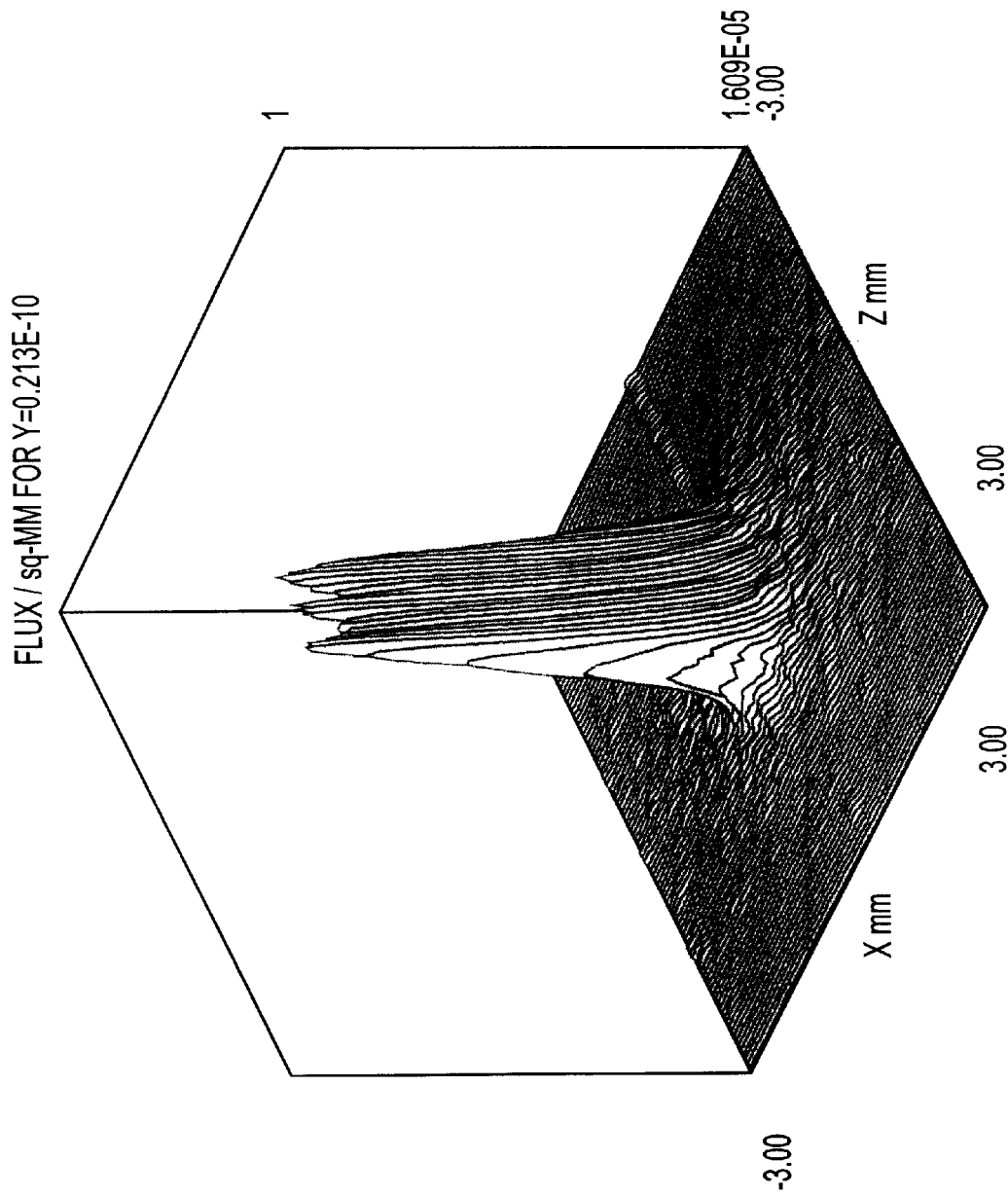
FIG. 5 is an isometric plot of an output flux from a typical light source.

At the input end of the target 60, the intensity profile bears substantially the shape of the light source 20 and is generally close to rectangular. As shown in FIG. 5, the spot of the resulting light output is approximately rectangular with sides of lengths in the neighborhood of about 1.6 mm and about 2.7 mm. The projection lens 108 is typically about an F/3 lens, which is equivalent to a numerical aperture of about 0.165, as known in the art. To achieve substantially the same numerical aperture in both direction at the output of the tapered homogenizer and using the invariance of the product of the length and the numerical aperture, the output dimensions of the homogenizer are in the neighborhood of about 11.6 mm and about 9.7 mm which has an aspect ratio of about 1.2 which is very close to the desire aspect ratio of about 1.33 for a normal TV format. To achieve substantially the exact output aspect ratio, the input dimension can be changed accordingly such that substantially maximum output can be obtained.

Figure 6:
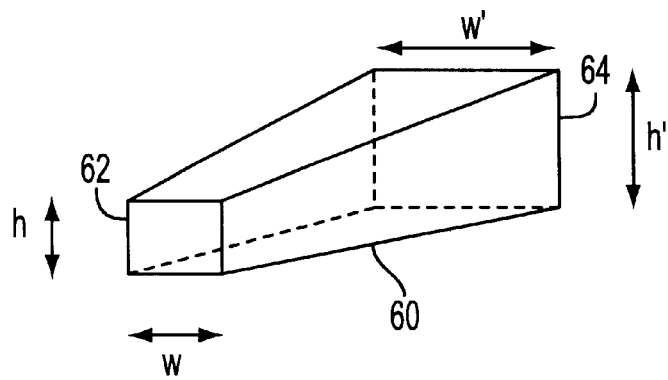
FIG. 6 is a schematic illustration of a tapered homogenizer used in a preferred embodiment of the collecting and condensing optical system of the present invention.

Thus, in a preferred embodiment, the target 60 is an increasing taper waveguide, as illustrated in FIG. 6. The tapered homogenizer is dimensioned so that the height to width ration (h/w) at the imput target surface 62 is substantially equal to the height to width ration (h'/w') at the output target surface 64. In the tapered homogenizer 60, the numerical aperture in both directions and the input/output areas are transformed. This homogenizer 60 can be made with quartz, glass or plastic, depending on the amount of power being used. For certain applications, the homogenizer can also be cladded in which the rod is coated with a lower index cladding materials. In another embodiment, the homogenizer can be a hollow light pipe in which the inside surfaces are highly reflective and the shape of the side walls is designed to provide the transformation required.

In view of this description of the invention, it will be apparent to those skilled in the art that the same may be varied in many ways without departing from the spirit and scope of the invention. Any and all such modifications are intended to be included within the scope of the following claims.

I claim:

1. An image projection device comprising an image source; and an optical device that illuminates said image source, said optical device comprising a source of electromagnetic radiation, a target to be illuminated with at least a portion of the electromagnetic radiation emitted by said source, a first reflector comprising at least a portion of a paraboloid of revolution, said first reflector having an optical axis and a first focal point on said optical axis, said source being proximate to said first focal point such that some of the electromagnetic energy is organized into collimated rays parallel to said optical axis, and a second reflector comprising at least a portion of a paraboloid of revolution, said second reflector having an optical axis and a second focal point on said optical axis, said target being proximate to said second focal point, said second reflector being positioned and orientated with respect to said first reflector to receive a substantial portion of said collimated rays of electromagnetic energy so that said second reflector redirects said collimated rays toward said target, wherein said collimating reflector and said focussing reflector have substantially the same size and shape and are oriented substantially optically symmetrically with respect to each other so that substantially each ray of radiation reflected by a surface portion of said collimating reflector is reflected by a corresponding surface portion of said focussing reflector toward said target.

2. The optical device of claim 1, wherein a portion of the electromagnetic radiation emitted by said source of electromagnetic radiation impinges directly on said collimating reflector and a portion of the electromagnetic radiation does not impinge directly on said collimating reflector and wherein said device further comprises at least one additional reflector constructed and arranged to reflect at least part of the portion of the electromagnetic radiation that does not impinge directly on said collimating reflector toward said collimating reflector through the focal point of said collimating reflector to increase the flux intensity of the collimated rays.

3. The optical device of claim 2, wherein said at least one additional reflector comprises a spherical retro-reflector disposed on a side of said source opposite said collimating reflector to reflect electromagnetic radiation emitted from said source in a direction away from said collimating reflector toward said collimating reflector through the focal point of said collimating reflector.

4. The optical device of claim 2, wherein said at least one additional reflector comprises a plurality of additional reflectors including:

a secondary collimating reflector comprising a portion of a paraboloid of revolution having an optical axis that substantially coincides with the optical axis of said collimating reflector and a focal point that substantially coincides with the focal point of said collimating reflector so that electromagnetic radiation emitted from said source in a direction away from said collimating reflector produces collimated rays of electromagnetic radiation reflected from said secondary collimating reflector in a direction substantially parallel to the optical axis of said secondary collimating reflector; and a generally flat reflector that is substantially perpendicular to the optical axis of said secondary collimating reflector and constructed and arranged to reflect the collimated rays of electromagnetic radiation reflected from said secondary collimating reflector to produce collimated rays of electromagnetic radiation reflected from said flat reflector in a direction substantially parallel to the optical axis of said secondary collimating reflector, the collimated rays reflected from said flat reflector thereafter being reflected by said secondary collimating reflector toward said collimating reflector through the focal point of said collimating reflector.

5. The collecting and condensing system of claim 1, wherein said target is a single optic fiber.

6. The collecting and condensing system of claim 1 wherein said target is a bundle of optic fibers.

7. The collecting and condensing system of claim 1 wherein said target is a tapered homogenizer.

8. The collecting and condensing system of claim 7 wherein said homogenizer has a polygonal cross-section.

9. The collecting and condensing system of claim 1 wherein said light source is selected from a group consisting of a xenon, mercury xenon, metal halide, and halogen lamp.

10. The collecting and condensing system of claim 1 wherein said first paraboloid reflector is coated with a multi-dielectric coating reflecting only visible light.

11. The collecting and condensing system of claim 1 further comprising a transmissive filter placed between said first paraboloid and said second paraboloid reflectors.

12. The collecting and condensing system of claim 8 wherein said polygon is a rectangle.

13. The collecting and condensing system of claim 8 wherein said polygon is a square.

14. The collecting and condensing system of claim 1 wherein said light source has an arc angle of 180 degrees.

15. The collecting and condensing system of claim 1, wherein said target is a homogenizer that has a hollow pipe with reflective inner surfaces.

16. The collecting and condensing system of claim 15 wherein said hollow pipe is tapered.

17. A system for collection light from an arc lamp to a homogenizer comprising:

an optical axis, a first paraboloid with its axis substantially collinear to said optical axis with a circular cross-section subtending an arc angle less than about 180 degrees with respect to said optical axis, an arc lamp placed substantially at the focus of said first paraboloid, a second paraboloid with substantially the same dimension as said first paraboloid and placed with its axis substantially collinear to said optical axis place and substantially symmetrically with respect to said first paraboloid, a homogenizer placed substantially at the focus of said second paraboloid for substantially maximum collection of light.

18. The system according to claim 17 further comprising a spherical retro-reflector placed substantially directly opposite to said first paraboloid.

19. The system according to claim 17 wherein said arc lamp is selected from a group consisting of a xenon lamp, metal-halide lamp, and xenon-mercury lamp.

20. The system according to claim 17 wherein said homogenizer is a single fiber.

21. The system according to claim 17 wherein said homogenizer is a fiber bundle.

22. The system according to claim 17 wherein said homogenizer is rectangular.

23. The system according to claim 17 wherein said homogenizer is tapered.

* * * * *